(12) United States Patent
Obama

(10) Patent No.: US 7,706,087 B2
(45) Date of Patent: Apr. 27, 2010

(54) OPTICAL SYSTEM AND OPTICAL APPARATUS

(75) Inventor: Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/197,373

(22) Filed: Aug. 25, 2008

(65) Prior Publication Data

US 2009/0059393 A1 Mar. 5, 2009

(30) Foreign Application Priority Data

Aug. 30, 2007 (JP) ............... 2007-224459

(51) Int. Cl.
*G02B 9/06* (2006.01)
(52) U.S. Cl. .................. 359/794; 359/708; 359/717
(58) Field of Classification Search ......... 359/708–717, 359/754–757, 759, 760, 763, 764, 767–769, 359/771, 772, 779, 780, 784, 791–794; 348/240.99–240.3, 348/335–369; 396/72–88
See application file for complete search history.

(56) References Cited

U.S. PATENT DOCUMENTS

| | | | |
|---|---|---|---|
| 3,874,771 A | 4/1975 | Behrens et al. | |
| 4,364,644 A | 12/1982 | Ikemori | |
| 4,448,497 A | 5/1984 | Wakamiya | |
| 5,719,706 A | 2/1998 | Masumoto et al. | |
| 2009/0086340 A1* | 4/2009 | Sato | ............... 359/794 |

FOREIGN PATENT DOCUMENTS

| | | |
|---|---|---|
| JP | 58-57725 | 12/1983 |
| JP | 06-242370 | 2/1994 |

* cited by examiner

*Primary Examiner*—Darryl J Collins
(74) *Attorney, Agent, or Firm*—Miles & Stockbridge P.C.

(57) ABSTRACT

Providing an optical system having a large aperture ratio, a long back focal length, high optical performance with excellently correcting various aberrations, and an optical apparatus equipped with the optical system. The system includes, in order from an object along an optical axis of the optical system, a first lens group having positive refractive power, and a second lens group having positive refractive power. The second lens group includes a negative lens, a first positive lens, and a second positive lens, and the optical system includes a compound type aspherical lens constructed by a glass material and a resin material.

36 Claims, 9 Drawing Sheets

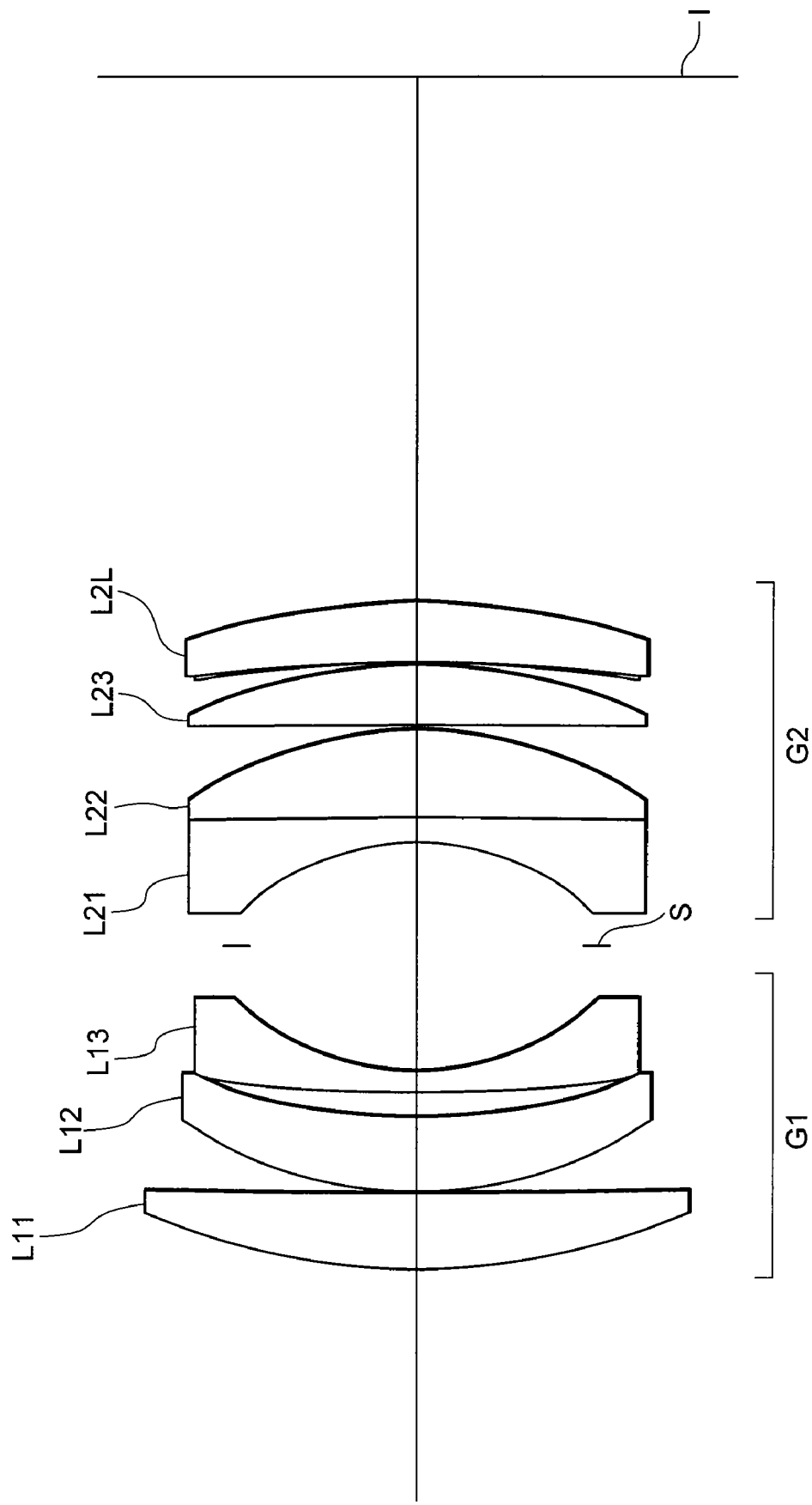

OPTICAL SYSTEM AND OPTICAL APPARATUS

The disclosure of the following priority application is herein incorporated by reference:

Japanese Patent Application No. 2007-224459 filed on Aug. 30, 2007.

BACKGROUND OF THE INVENTION

1. Field of the Invention

The present invention relates to an optical system used as an interchangeable lens for a single-lens reflex camera and a photocopy lens, an optical apparatus using the optical system.

2. Related Background Art

There have been proposed a lot of cases that a so-called Double-Gauss type lens system is used as a lens system for a single-lens reflex camera or a photocopy lens system such as Japanese Examined Patent Application Publication No. 58-057725.

However, in the optical system disclosed in Japanese Examined Patent Application Publication No. 58-057725, spherical aberration, curvature of field, and distortion have been excellently corrected, but sagittal coma, which is specially generated in a Double-Gauss type lens system upon fully opening the aperture stop, considerably remains, so that it has been hardly to say that the optical system has sufficiently high optical performance.

SUMMARY OF THE INVENTION

The present invention is made in view of the above-described problems, and has an object to provide an optical system overcoming the problems.

According to a first aspect of the present invention, there is provided an optical system comprising, in order from an object along an optical axis of the optical system: a first lens group having positive refractive power; and a second lens group having positive refractive power; the second lens group including a 21 lens having negative refractive power, a 22 lens having positive refractive power and a 23 lens having positive refractive power, and the optical system having a compound-type aspherical lens constructed by a glass material and a resin material.

According to a second aspect of the present invention, there is provided an optical system comprising, in order from an object along an optical axis of the optical system: a first lens group having positive refractive power; and a second lens group having positive refractive power, the first lens group including a 11 lens having positive refractive power with stronger refractive power on the object side surface than that on the image side surface, and a 12 lens having positive meniscus shape with a convex surface facing the object, and the optical system having a compound-type aspherical lens constructed by a glass material and a resin material.

According to a third aspect of the present invention, there is provided an optical apparatus equipped with the optical system according to the first aspect.

According to a fourth aspect of the present invention, there is provided an optical apparatus equipped with the optical system according to the second aspect.

According to a fifth aspect of the present invention, there is provided a method for forming an image of an object by an optical system comprising a step of: providing the optical system including, in order from the object along an optical axis of the optical system, a first lens group having positive refractive power, and a second lens group having positive refractive power, the second lens group including a 21 lens having negative refractive power, a 22 lens having positive refractive power and a 23 lens having positive refractive power, and the optical system having a compound-type aspherical lens constructed by a glass material and a resin material.

According to a sixth aspect of the present invention, there is provided a method for forming an image of an object by an optical system comprising a step of: providing the optical system including, in order from the object along an optical axis of the optical system, a first lens group having positive refractive power, and a second lens group having positive refractive power, the first lens group including a 11 lens having positive refractive power with stronger refractive power on the object side surface than that on the image side surface, and a 12 lens having positive meniscus shape with a convex surface facing the object, and the optical system having a compound-type aspherical lens constructed by a glass material and a resin material.

The present invention makes it possible to provide an optical system having a large aperture ratio, a long back focal length, and high optical performance with excellently correcting various aberrations, and an optical apparatus equipped with the optical system.

BRIEF DESCRIPTION OF THE DRAWINGS

FIGS. 2A and 2B are graphs showing various aberrations of the optical system according to Example 1, in which FIG. 2A shows upon focusing on infinity ($\beta$=0.00), and FIG. 2B shows upon focusing on a close object ($\beta$=−1/30).

FIGS. 4A and 4B are graphs showing various aberrations of the optical system according to Example 2, in which FIG. 4A shows upon focusing on infinity ($\beta$=0.00), and FIG. 4B shows upon focusing on a close object ($\beta$=−1/30).

FIGS. 6A and 6B are graphs showing various aberrations of the optical system according to Example 3, in which FIG. 6A shows upon focusing on infinity ($\beta$=0.00), and FIG. 6B shows upon focusing on a close object ($\beta$=−1/30).

FIG. 7 is a sectional view showing a lens configuration of an optical system according to Example 4.

FIGS. 8A and 8B are graphs showing various aberrations of the optical system according to Example 4, in which FIG. 8A shows upon focusing on infinity ($\beta$=0.00), and FIG. 8B shows upon focusing on a close object ($\beta$=−1/30).

DESCRIPTION OF THE MOST PREFERRED EMBODIMENT

Figure 1:
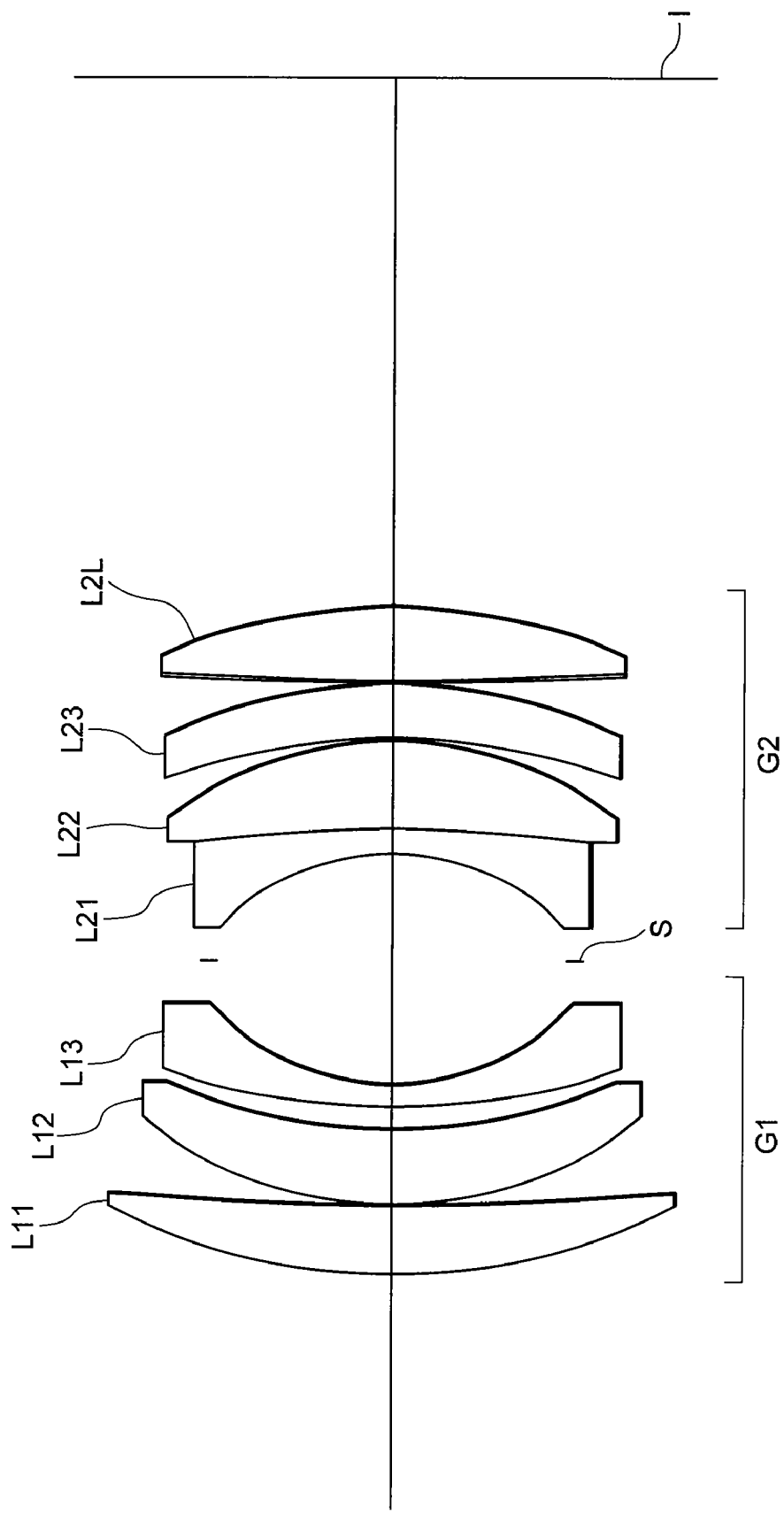
FIG. 1 is a sectional view showing a lens configuration of an optical system according to Example 1.

An optical system according to the present embodiment is explained below.

An optical system according to the present embodiment includes, in order from an object along an optical axis of the optical system, a first lens group having positive refractive power, and a second lens group having positive refractive power, the first lens group includes a 11 lens having positive refractive power with stronger refractive power on the object side surface than that on the image side surface, and a 12 lens having positive meniscus shape with a convex surface facing the object, the second lens group includes a 21 lens having negative refractive power, a 22 lens having positive refractive power and a 23 lens having positive refractive power. With this lens configuration, it becomes possible to realize a so-called symmetric, Double-Gauss type refractive power distribution, so that distortion is excellently corrected as well as spherical aberration and curvature of field.

In a Double-Gauss type optical system without using an aspherical lens, negative spherical aberration generated in the optical system is corrected by making curvature of the object side of the 21 lens stronger (shorter the radius of curvature). On the other hand, the object side lens surface of the 21 lens largely generates sagittal coma.

In the explanation in the application, large and small regarding curvature, radius of curvature and refractive power means large and small of the absolute value thereof.

In an optical system according to the present embodiment, with configuring the optical system having a compound type aspherical lens constructed by a glass material and a resin material, it becomes possible to effectively correct negative spherical aberration. Accordingly, curvature of the object side surface of the 21 lens can be small, in other words, the radius of curvature can be large, so that sagittal coma can be suppressed simultaneously. In an aspherical lens according to the present embodiment, in order to suppress generation of negative spherical aberration, positive refractive power of a positive lens gradually becomes weaker as the radius increases from the optical axis. Moreover, the compound type aspherical lens constructed by a glass material and a resin material can be fabricated cheaper than an aspherical lens constructed by only a glass material. Because, in the case of the aspherical lens constructed by only a glass material, in order to form an aspherical surface, it is necessary to take either a fine grinding process that is more time-consuming process than a spherical polishing or a glass molding process that is also time-consuming process with heating up to about 500 degrees and cooling down. On the other hand, in the case of a compound type aspherical lens, an aspherical surface is formed on a resin material that has much fluidity than a glass material, so that the manufacturing cost based on the manufacturing time can be suppressed. Moreover, since a resin material has better moldability than a glass material, forming an aspherical surface is relatively easy.

In an optical system according to the present embodiment, the following conditional expression (1) is preferably satisfied:

$$0.60<Bf/f<1.00 \tag{1}$$

where f denotes a focal length of the optical system, and Bf denotes a distance along the optical axis between the most image side lens surface and an image plane.

Conditional expression (1) is for realizing high optical performance with securing the back focal length suitable for an interchangeable lens for a single-lens reflex camera and a photocopy lens.

When the ratio Bf/f is equal to or falls below the lower limit of conditional expression (1), the back focal length becomes relatively short with respect to the focal length of the optical system, so that it becomes difficult to obtain an optical system suitable for an interchangeable lens for a single-lens reflex camera and a photocopy lens.

On the other hand, when the ratio Bf/f is equal to or exceeds the upper limit of conditional expression (1), the back focal length becomes relatively too long with respect to the focal length of the optical system, refractive power distribution becomes further away from a symmetrical type, so that it becomes difficult to correct distortion and high optical performance cannot be realized.

In order to secure the effect of the present application, it is preferable to set the upper limit of conditional expression (1) to 0.85.

In an optical system according to the present embodiment, the following conditional expression (2) is preferably satisfied:

$$1.400<nP<1.800 \tag{2}$$

where nP denotes a refractive index of the resin material of the compound type aspherical lens at d-line in which wavelength $\lambda=587.6$ nm.

Conditional expression (2) is for obtaining high optical performance with suitably selecting the refractive index of the resin material of the compound type aspherical lens.

When the value nP is equal to or falls below the lower limit of conditional expression (2), in other words, when the refractive index of the resin material of the compound type aspherical lens becomes too small, a deviation amount from reference sphere has to be large so as to sufficiently obtain the effect of the aspherical surface. In the resin material that is liable to be varied upon thermal expansion or hygroscopic expansion, thickness of the resin material of the compound type aspherical lens in the vicinity of the optical axis becomes significantly different from that in the periphery of the lens in proportional to the deviation amount from reference sphere. Accordingly, spherical aberration and curvature of field vary largely, so that high optical performance cannot be realized.

When the value nP is equal to or exceeds the upper limit of conditional expression (2), in other words, when the refractive index of the resin material of the compound type aspherical lens becomes excessively high, in the resin material that is liable to be varied upon thermal expansion or hygroscopic expansion, the material becomes excessively inclined to be influenced by temperature or humidity. Accordingly, spherical aberration and curvature of field vary largely, so that high optical performance cannot be realized.

In order to secure the effect of the present embodiment, it is preferable to set the lower limit of conditional expression (2) to 1.450. In order to further secure the effect of the present embodiment, it is most preferable to set the lower limit of conditional expression (2) to 1.500.

In an optical system according to the present embodiment, the following conditional expression (3) is preferably satisfied:

$$1.550<nG \tag{3}$$

where nG denotes a refractive index of a glass material of the compound type aspherical lens at d-line (wavelength $\lambda=587.6$ nm).

Conditional expression (3) is for obtaining high optical performance with suitably setting refractive index of the glass material of the compound type aspherical lens.

When the value nG is equal to or falls below the lower limit of conditional expression (3), when the compound type aspherical lens is positive, negative spherical aberration is excessively generated. In order to correct negative spherical aberration, curvature of the object side lens surface of the 21 lens is necessary to become large (the radius of curvature becomes small). Accordingly, sagittal coma is excessively generated from the object side lens surface of the 21 lens, so that high optical performance cannot be obtained. When the compound type aspherical lens is negative, sagittal coma is excessively generated, so that high optical performance cannot be realized.

In order to secure the effect of the present embodiment, it is preferable to set the lower limit of conditional expression (3) to 1.580.

In an optical system according to the present embodiment, when the lens disposed to the most image side is assumed to be the 2L lens, at least one of the lens surfaces between the image side surface of the 11 lens and the object side surface of the 2L lens is preferably a resin material surface of a compound type aspherical lens.

A resin material has lower hardness than a glass material. When the object side surface of the 11 lens or the image side surface of the 2L lens that a user can easily make contact with is a resin surface, the surface is liable to get scratched due to low hardness of the resin material. When the lens surface is got scratched, it becomes a cause of flare and the like, so that high optical performance cannot be secured.

In an optical system according to the present embodiment, the 2L lens is preferably a compound type aspherical lens.

In a Double-Gauss type lens system according to the present embodiment, with setting the 2L lens to be an aspherical lens, it becomes possible to effectively correct negative spherical aberration. As a result, curvature of the object side surface of the 21 lens, which is the source of generating sagittal coma, can be small (the radius of curvature can be large), so that generation of sagittal coma can be suppressed, and high optical performance can be obtained.

In an optical system according to the present embodiment, the following conditional expression (4) is preferably satisfied:

$$1.700 < n2L \quad (4)$$

where n2L is a refractive index of the glass material of the 2L lens at d-line (wavelength $\lambda$=587.6 nm).

Conditional expression (4) is for realizing high optical performance with suppressing sagittal coma.

When the value n2L is equal to or falls below the lower limit of conditional expression (4), negative spherical aberration excessively generates in the 2L lens. In order to correct such negative spherical aberration, curvature of the object side surface of the 21 lens has to be large (the radius of curvature has to be small), so that sagittal coma is excessively generated on the object side surface of the 21 lens, and high optical performance cannot be attained.

In order to secure the effect of the present embodiment, it is preferable to set the lower limit of conditional expression (4) to 1.720.

In an optical system according to the present embodiment, the following conditional expression (5) is preferably satisfied:

$$n2L - nP < 0.400 \quad (5)$$

where n2L denotes a refractive index of the glass material of the 2L lens at d-line (wavelength $\lambda$=587.6 nm), and nP denotes a refractive index of the resin material of the 2L lens at d-line (wavelength $\lambda$=587.6 nm).

Conditional expression (5) is for realizing high optical performance with suppressing various aberrations generated on the boundary surface between the glass material and the resin material of the compound type aspherical lens.

When the value n2L−nP is equal to or exceeds the upper limit of conditional expression (5), difference of the refractive indices of the boundary surface between the glass material and the resin material of the compound type aspherical lens becomes large. As a result, spherical aberration, coma and chromatic aberration are generated on the boundary surface, so that high optical performance cannot be attained.

In order to secure the effect of the present embodiment, it is preferable to set the upper limit of conditional expression (5) to 0.300. In order to secure the effect of the present embodiment, it is preferable to set the lower limit of conditional expression (5) to −0.400. When the value n2L−nP is equal to or falls below −0.400, difference of the refractive indices of the boundary surface between the glass material and the resin material of the compound type aspherical lens becomes large. As a result, spherical aberration, coma and chromatic aberration are generated on the boundary surface, so that high optical performance cannot be attained.

In an optical system according to the present embodiment, the following conditional expression (6) is preferably satisfied:

$$0.300 < (-r21a)/f < 0.450 \quad (6)$$

where r21a denotes a radius of curvature of the object side surface of the 21 lens, and f denotes a focal length of the optical system.

Conditional expression (6) is for realizing high optical performance with effectively suppressing sagittal coma in an optical system having a large aperture ratio of the f-number of about 1.4.

When the ratio (−r21a)/f is equal to or falls below the lower limit of conditional expression (6), sagittal coma is excessively generated on the object side surface of the 21 lens, so that high optical performance cannot be attained.

On the other hand, when the ratio (−r21a)/f is equal to or exceeds the upper limit of conditional expression (6), variations in spherical aberration, curvature of field and astigmatism upon focusing from infinity to a close object or upon changing magnification become excessively large, so that high optical performance cannot be secured in a broad scope of variation in magnification or focusing from infinity to a close object.

In order to secure the effect of the present embodiment, it is preferable to set the lower limit of conditional expression (6) to 0.330. In order to secure the effect of the present embodiment, it is preferable to set the upper limit of conditional expression (6) to 0.370.

In an optical system according to the present embodiment, it is preferable that the second lens group has only the 2L lens to the image side of the 23 lens, and the 23 lens has positive refractive power.

With this lens configuration, it becomes possible to reduce cost by suppressing the number of lens elements in the optical system, as well as to provide an optical system realizing high optical performance with a large aperture ratio such as an f-number of about 1.4 with suppressing generation of negative spherical aberration by suitably distributing positive refractive power to the 23 lens and the 2L lens.

In an optical system according to the present embodiment, the first lens group preferably has only the 13 lens with negative refractive power to the image side of the 12 lens.

With this lens configuration, it becomes possible to reduce cost by suppressing the number of lens elements in the optical system, as well as to effectively correct negative spherical aberration generating on the other lenses by distributing negative refractive power to the 13 lens and the 21 lens, and to provide an optical system realizing high optical performance In an optical system according to the present embodiment, the following conditional expression (7) is preferably satisfied:

$$0.900 < (r21a)/r13b < 1.100 \qquad (7)$$

where r13b denotes a radius of curvature of the image side surface of the 13 lens, and r21a denotes a radius of curvature of the object side surface of the 21 lens.

Conditional expression (7) is for realizing high optical performance with effectively suppressing sagittal coma in an optical system with a large aperture ratio such as an f-number of about 1.4.

When the ratio (r21a)/r13b is equal to or exceeds the upper limit of conditional expression (7), in other words, when the curvature of the image side surface of the 13 lens is excessively larger (radius of curvature becomes smaller) than the curvature of the object side surface of the 21 lens, sagittal coma is excessively generated on the image side surface of the 13 lens, so that high optical performance cannot be attained.

On the other hand, when the ratio (r21a)/r13b is equal to or falls below the lower limit of conditional expression (7), in other words, when the curvature of the object side surface of the 21 lens is excessively larger (radius of curvature becomes smaller) than the curvature of the image side surface of the 13 lens, sagittal coma excessively generated on the object side surface of the 21 lens, so that high optical performance cannot be attained.

In order to secure the effect of the present embodiment, it is preferable to set the lower limit of conditional expression (7) to 0.950. In order to further secure the effect of the present embodiment, it is most preferable to set the lower limit of conditional expression (7) to 0.960. In order to secure the effect of the present embodiment, it is preferable to set the upper limit of conditional expression (7) to 1.050. In order to further secure the effect of the present embodiment, it is most preferable to set the upper limit of conditional expression (7) to 1.040.

In an optical system according to the present embodiment, the following conditional expression (8) is preferably satisfied:

$$0.680 < r23b/r2Lb < 1.000 \qquad (8)$$

where r23b denotes a radius of curvature of the image side surface of the 23 lens, and r2Lb denotes a radius of curvature of the image side surface of the 2L lens.

Conditional expression (8) is for realizing high optical performance with effectively correcting negative spherical aberration.

When the ratio r23b/r2Lb is equal to or falls below the lower limit of conditional expression (8), in other words, when the curvature of the image side surface of the 23 lens becomes excessively larger (radius of curvature becomes smaller) than the curvature of the image side surface of the 2L lens, negative spherical aberration is excessively generated on the image side surface of the 23 lens, so that high optical performance cannot be attained.

On the other hand, when the ratio r23b/r2Lb is equal to or exceeds the upper limit of conditional expression (8), in other words, when the curvature of the image side surface of the 2L lens becomes excessively lager (radius of curvature becomes smaller) than the curvature of the image side surface of the 23 lens, negative spherical aberration is excessively generated on the image side surface of the 2L lens, so that high optical performance cannot be attained.

In order to secure the effect of the present embodiment, it is preferable to set the lower limit of conditional expression (8) to 0.710. In order to secure the effect of the present embodiment, it is preferable to set the upper limit of conditional expression (8) to 0.960.

In an optical system according to the present embodiment, a distance between the first lens group and the second lens group is preferably always fixed.

With this lens configuration, it becomes possible to move the first lens group and the second lens group in a body upon focusing from infinity to a close object or changing magnification, so that the lens barrel can be manufactured with simple mechanical construction. Accordingly, manufacturing cost can be suppressed in comparison with a case the first lens group and the second lens group are not fixed. Mutual decentering between the first lens group and the second lens group becomes easy to be suppressed, so that generation of decentering coma caused by decentering can be suppressed.

In an optical system according to the present embodiment, a distance between the first lens group and the second lens group is preferably fixed upon focusing on infinity.

With this lens configuration, it becomes possible to move the first lens group and the second lens group in a body upon focusing from infinity to a close object, or upon changing magnification, so that the lens barrel can be manufactured with simple mechanical construction. Accordingly, manufacturing cost can be suppressed in comparison with a case the first lens group and the second lens group are not fixed. Mutual decentering between the first lens group and the second lens group becomes easy to be suppressed, so that generation of decentering coma caused by decentering can be suppressed.

In an optical system according to the present embodiment, there is preferably only one aspherical surface in the optical system.

An aspherical lens including a compound type aspherical lens according to the present embodiment has higher manufacturing cost than a spherical lens. Accordingly, with making an optical system with only one aspherical surface, it becomes possible to suppress manufacturing cost with realizing high optical performance by correcting aberrations. Moreover, it becomes possible to avoid deterioration of optical performance caused by manufacturing error such as decentering between aspherical surfaces upon disposing two aspherical surfaces or more in the optical.

In an optical system according to present embodiment, the 21 lens is preferably cemented with the 22 lens.

With cementing the 21 lens with the 22 lens, it becomes possible to excellently correct differences in coma and spherical aberration with respect to wavelengths, so that high optical performance can be attained.

In an optical system according to present embodiment, the following conditional expressions (9) and (10) are preferably satisfied:

$$-0.050 < n22 - n21 < 0.050 \qquad (9)$$

$$16.0 < v22 - v21 < 40.0 \qquad (10)$$

where n21 denotes the refractive index of the 21 lens at d-line (wavelength λ=587.6 nm), and v21 denotes the Abbe number of the 21 lens at d-line (wavelength λ=587.6 nm).

Conditional expression (9) is for realizing high optical performance with suppressing generation of spherical aberration and coma with correcting difference in coma with respect to the wavelength.

When the value n22−n21 is equal to or falls below the lower limit of conditional al expression (9), difference in the refractive indices of the 22 lens and the 21 lens becomes too large, so that spherical aberration and coma are generated at the boundary surface between the 21 lens and the 22 lens. Accordingly, high optical performance cannot be secured.

On the other hand, when the value n22−n21 is equal to or exceeds the upper limit of conditional expression (9), difference in the refractive indices of the 22 lens and the 21 lens becomes too large, so that spherical aberration and coma are generated at the boundary surface between the 21 lens and the 22 lens. Accordingly, high optical performance cannot be secured.

In order to secure the effect of the present embodiment, it is preferable to set the lower limit of conditional expression (9) to −0.022. In order to secure the effect of the present embodiment, it is preferable to set the upper limit of conditional expression (9) to 0.022.

Conditional expression (10) is for realizing high optical performance with effectively correcting difference in spherical aberration with respect to wavelength and difference in coma with respect to wavelength.

When the value ν22−ν21 is equal to or falls below the lower limit of conditional expression (10), in other words, when the difference in the Abbe numbers of the 22 lens and the 21 lens becomes too small, it becomes impossible to effectively correct difference in spherical aberration with respect to the wavelength or difference in coma with respect to the wavelength, so that high optical performance is difficult to be attained.

On the other hand, when the value ν22−ν21 is equal to or exceeds the upper limit of conditional expression (10), in other words, when the difference in the Abbe numbers of the 22 lens and the 21 lens becomes too large, correction of difference in spherical aberration with respect to the wavelength and correction of difference in coma with respect to the wavelength become too much, so that high optical performance cannot be attained.

In order to secure the effect of the present embodiment, it is preferable to set the lower limit of conditional expression (10) to 18.0. In order to secure the effect of the present embodiment, it is preferable to set the upper limit of conditional expression (10) to 30.0.

In an optical system according to the present embodiment, an aperture stop is preferably disposed between the first lens group and the second lens group. With this lens configuration, it becomes possible to construct a so-called Double-Gauss lens type optical system, so that high optical performance can be attained with effectively correct distortion and lateral chromatic aberration.

An optical system according to each Example of the present embodiment is explained with reference to accompanying drawings.

EXAMPLE 1

FIG. 1 is a sectional view showing a lens configuration of an optical system according to Example 1.

The optical system according to Example 1 is composed of, in order from an object along an optical axis of the optical system, a first lens group G1 having positive refractive power, and a second lens group G2 having positive refractive power. An aperture stop S is disposed between the first lens group G1 and the second lens group G2.

The first lens group G1 composed of, in order from the object along the optical axis, a 11 positive meniscus lens L11 having a convex surface facing the object and refractive power of the object side surface being stronger than that of the image side surface, a 12 positive meniscus lens L12 having a convex surface facing the object and refractive power of the object side surface being stronger than that of the image side surface, and a 13 negative meniscus lens L13 having a concave surface facing the image.

The second lens group G2 is composed of, in order from the object along the optical axis, a cemented lens constructed by a 21 negative meniscus lens L21 having a concave surface facing the object cemented with a 22 positive meniscus lens L22 having a concave surface facing the object, a 23 positive meniscus lens L23 having a convex surface facing the image, and a 2L double convex positive lens L2L disposed to the most image side of the optical system, being a compound type aspherical lens having refractive power of the object side surface, which is an aspherical surface formed on a resin material, being weaker than that of the image side surface. A ray of light emitted from the 2L lens forms an image on the image plane I.

Focusing on a close object is carried out by moving the first lens group G1 and the second lens group G2 in a body to the object along the optical axis.

Various values associated with the optical system according to Example 1 are listed in Table 1.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "νd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Aspherical Data], an aspherical surface is exhibited by the following expression:

$$X(y)=(y^2/r)/[1+[1-\kappa(y^2/r^2)]^{1/2}]+A4\times y^4+A6\times y^6+A8\times y^8$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, An denotes aspherical coefficient of n-th order, "E-n" denotes "×10$^{-n}$", for example, "1.234E-05" denotes "1.234×10$^{-5}$" and the position of an aspherical surface is expressed by attaching "*" to the right side of the surface number.

In [Specifications], f denotes a focal length of the optical system, FNO denotes an f-number, ω denotes a half angle of view in degrees, y denotes an image height, and TL denotes a distance between the object side surface of the 11 lens and the image plane I in a state focusing on infinity.

In [Focusing Data], "Infinity" denotes a case upon focusing on an object locating at infinity, "Close Range" denotes a case focusing on a close object, R denotes a photographing distance (unit: m), which is between an object and the image plane I, β denotes imaging magnification, and Bf denotes a back focal length.

In [Values for Conditional Expressions], values for respective conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Lens Data]

| i | r | d | nd | vd |
|---|---|---|---|---|
| 1 | 41.3555 | 5.0000 | 1.804000 | 46.57 |
| 2 | 158.7150 | 0.1000 | | |
| 3 | 27.3795 | 5.5000 | 1.834807 | 42.71 |
| 4 | 36.9003 | 1.6000 | | |
| 5 | 45.7517 | 1.6000 | 1.698947 | 30.13 |
| 6 | 16.8163 | 9.3000 | | |
| 7 | ∞ | 7.7000 | Aperture Stop S | |
| 8 | −17.2554 | 1.8000 | 1.755199 | 27.51 |
| 9 | −153.0397 | 6.5000 | 1.754999 | 52.32 |
| 10 | −26.6098 | 0.2000 | | |
| 11 | −50.0504 | 4.0000 | 1.834807 | 42.71 |
| 12 | −39.2206 | 0.1000 | | |
| 13* | 169.3173 | 0.1000 | 1.552810 | 37.63 |
| 14 | 169.3173 | 5.5000 | 1.729157 | 54.68 |
| 15 | −42.3874 | (Bf) | | |

[Aspherical Data]
Surface Number: 13

| K = | 1.0000 |
|---|---|
| A4 = | −2.0184E−06 |
| A6 = | 7.7020E−10 |
| A8 = | −9.5209E−13 |

[Specifications]

| f = | 51.61 |
|---|---|
| FNO = | 1.44 |
| ω = | 23.00 |
| Y = | 21.60 |
| TL = | 87.48 |

[Focusing Data]

| | Infinity | Close Range |
|---|---|---|
| R | ∞ | 1.64 (m) |
| β | 0.0 | −1/30 |
| Bf | 38.4757 | 40.1961 |

[Values for Conditional Expressions]

| (1): Bf/f = | 0.75 |
|---|---|
| (2): nP = | 1.553 |
| (3): nG = | 1.729 |
| (4): n2L = | 1.729 |
| (5): n2L − nP = | 0.176 |
| (6): (−r21a)/f = | 0.334 |
| (7): (−r21a)/r13b = | 1.026 |
| (8): r23b/r2Lb = | 0.925 |
| (9): n22 − n21 = | 0.000 |
| (10): ν22 − ν21 = | 24.8 |

Figure 2A:
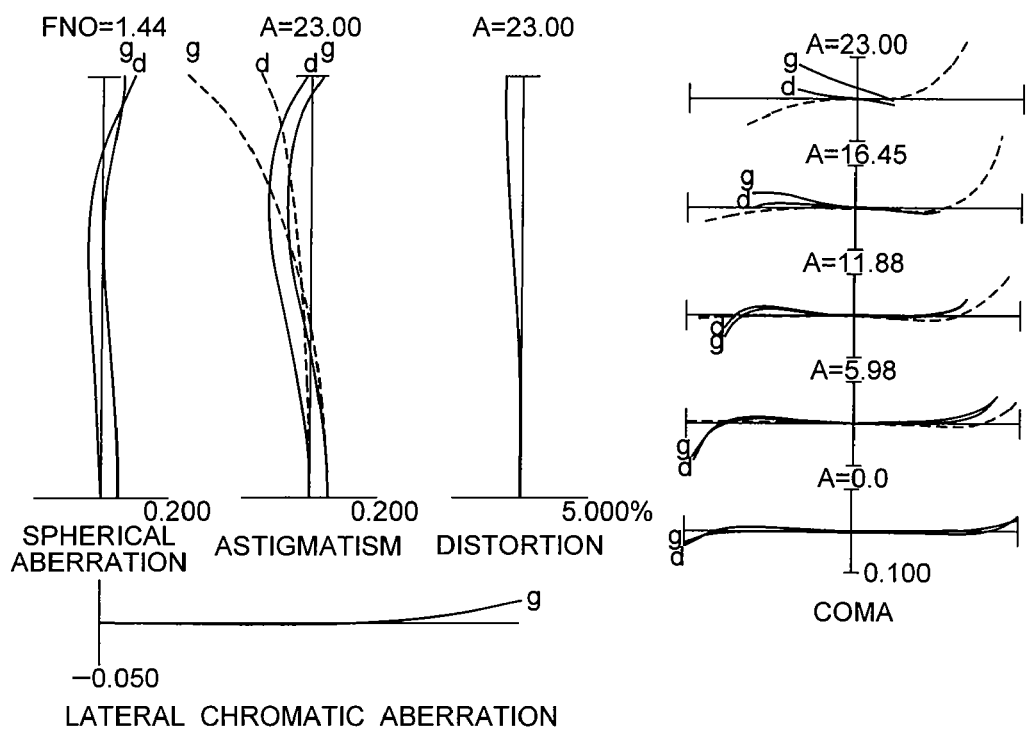
Figure 2B:
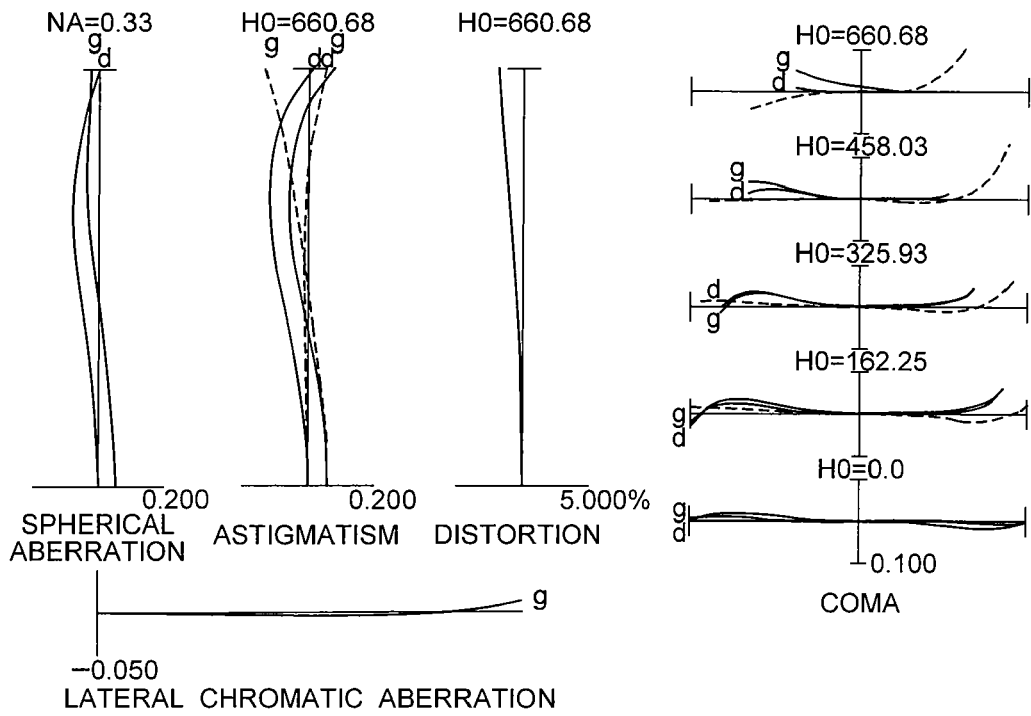

FIGS. 2A and 2B are graphs showing various aberrations of the optical system according to Example 1, in which FIG. 2A shows upon focusing on infinity (β=0.00), and FIG. 2B shows upon focusing on a close object (β=−1/30).

In respective graphs, FNO denotes an f-number, A denotes a half angle of view in degrees, NA denotes a numerical aperture, and HO denotes an object height (unit: mm). In respective graphs, d denotes aberration curve at d-line (wavelength λ=587.6 nm), and g denotes aberration curve at g-line (wavelength λ=435.8 nm), and those without notations denote various aberrations at d-line. In graphs showing astigmatism, a solid line indicates a sagittal image plane, and a broken line indicates a meridional image plane.

In graphs showing spherical aberration, f-number with respect to the maximum aperture or the maximum numerical aperture is shown. In graphs showing astigmatism and distortion, the maximum value of the image height is shown. In graphs showing coma, a solid line denotes meridional coma at d-line or g-line with respect to each object height, a broken line to the right side of the origin denotes sagittal coma generating in the meridional direction at d-line, and a broken line to the left side of the origin denotes sagittal coma generating in the sagittal direction at d-line.

The above-described explanations regarding various aberration graphs are the same as the other Examples, and duplicated explanations are omitted.

As is apparent from the respective graphs, the optical system according to Example 1 shows superb optical performance as a result of good corrections to various aberrations.

EXAMPLE 2

Figure 3:
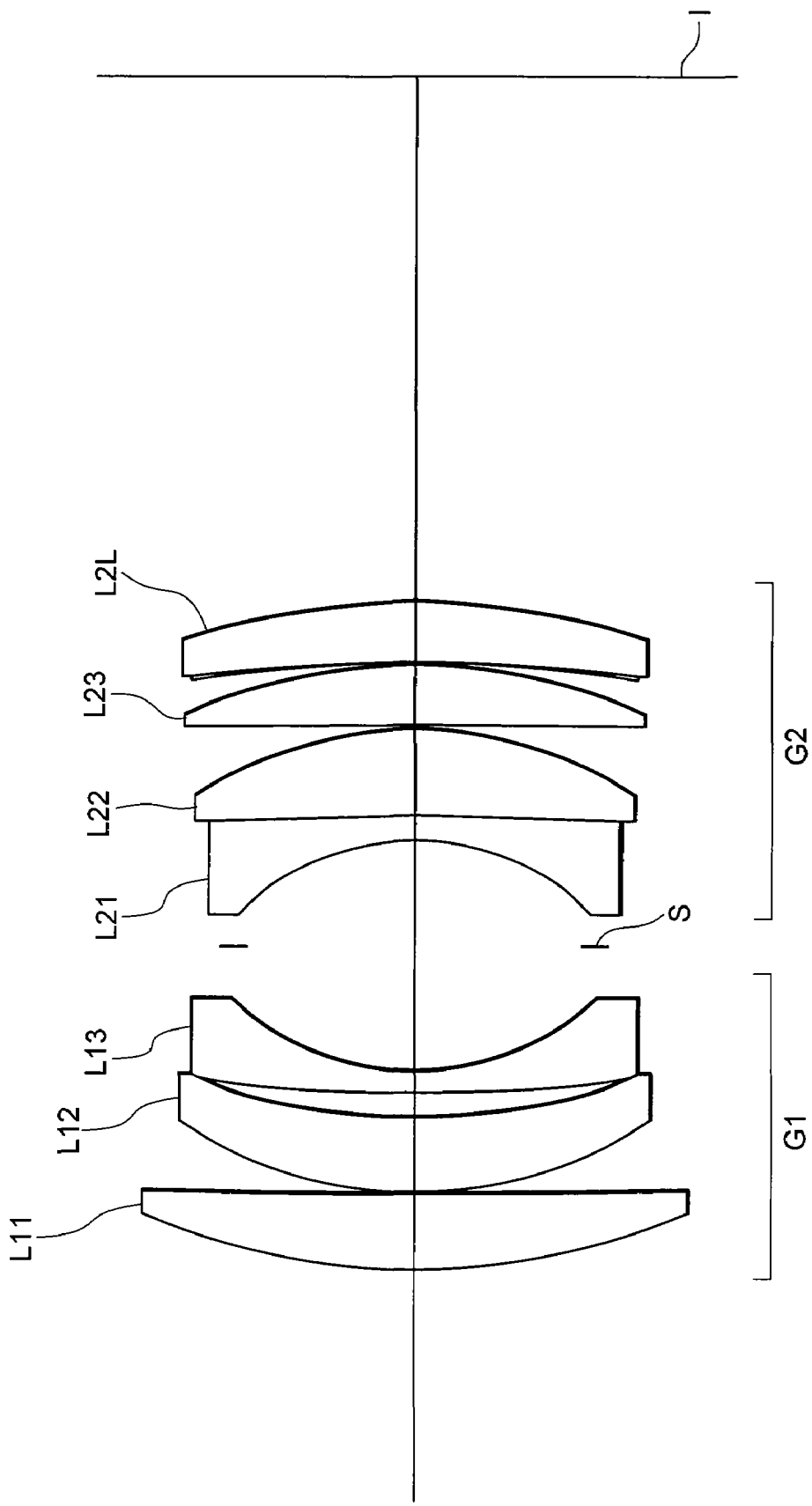
FIG. 3 is a sectional view showing a lens configuration of an optical system according to Example 2.

FIG. 3 is a sectional view showing a lens configuration of an optical system according to Example 2.

The optical system according to Example 2 is composed of, in order from an object along an optical axis of the optical system, a first lens group G1 having positive refractive power, and a second lens group G2 having positive refractive power. An aperture stop S is disposed between the first lens group G1 and the second lens group G2.

The first lens group G1 composed of, in order from the object along the optical axis, a 11 positive meniscus lens L11 having a convex surface facing the object and refractive power of the object side surface being stronger than that of the image side surface, a 12 positive meniscus lens L12 having a convex surface facing the object and refractive power of the object side surface being stronger than that of the image side surface, and a 13 negative meniscus lens L13 having a concave surface facing the image.

The second lens group G2 is composed of, in order from the object along the optical axis, a cemented lens constructed by a 21 negative meniscus lens L21 having a convex surface facing the image cemented with a 22 positive meniscus lens L22 having a concave surface facing the object, a 23 double convex positive lens L23 having a stronger refractive power on the image side surface, and a 2L positive meniscus lens L2L disposed to the most image side of the optical system, being a compound type aspherical lens composed of a resin material and a glass material, having a convex surface facing the image, and an aspherical surface formed on a resin material facing the object. A ray of light emitted from the 2L lens forms an image on the image plane I.

Focusing on a close object is carried out by moving the first lens group G1 and the second lens group G2 in a body to the object along the optical axis.

Various values associated with the optical system according to Example 2 are listed in Table 2.

TABLE 2

[Lens Data]

| i | r | d | nd | vd |
|---|---|---|---|---|
| 1 | 46.6380 | 5.5000 | 1.804000 | 46.57 |
| 2 | 345.6367 | 0.1000 | | |
| 3 | 29.2487 | 5.5000 | 1.834807 | 42.71 |
| 4 | 40.6547 | 1.8000 | | |
| 5 | 87.8670 | 1.6000 | 1.647689 | 33.79 |
| 6 | 18.7104 | 9.3000 | | |
| 7 | ∞ | 7.7000 | Aperture Stop S | |
| 8 | −18.4227 | 1.8000 | 1.805181 | 25.42 |
| 9 | −486.2010 | 6.5000 | 1.804000 | 46.57 |
| 10 | −29.5127 | 0.2000 | | |

TABLE 2-continued

| 11 | 1057.3415 | 4.5000 | 1.834807 | 42.71 |
|---|---|---|---|---|
| 12 | −42.1357 | 0.1000 | | |
| 13* | −149.4499 | 0.1000 | 1.552810 | 37.63 |
| 14 | −149.4499 | 4.5000 | 1.772499 | 49.60 |
| 15 | −56.5247 | (Bf) | | |

[Aspherical Data]
Surface Number: 13

| K = | 1.0000 |
|---|---|
| A4 = | −2.3336E−06 |
| A6 = | 1.3285E−09 |
| A8 = | −3.9009E−12 |

[Specifications]

| f = | 51.60 |
|---|---|
| FNO = | 1.44 |
| ω = | 23.12 |
| Y = | 21.60 |
| TL = | 87.71 |

[Focusing Data]

| | Infinity | Close Range |
|---|---|---|
| R | ∞ | 1.64 (m) |
| β | 0.0 | −1/30 |
| Bf | 38.5078 | 40.2277 |

[Values for Conditional Expressions]

| (1): Bf/f = | 0.75 |
|---|---|
| (2): nP = | 1.553 |
| (3): nG = | 1.773 |
| (4): n2L = | 1.773 |
| (5): n2L − nP = | 0.220 |
| (6): (−r21a)/f = | 0.357 |
| (7): (−r21a)/r13b = | 0.985 |
| (8): r23b/r2Lb = | 0.745 |
| (9): n22 − n21 = | −0.001 |
| (10): ν22 − ν21 = | 21.2 |

Figure 4A:
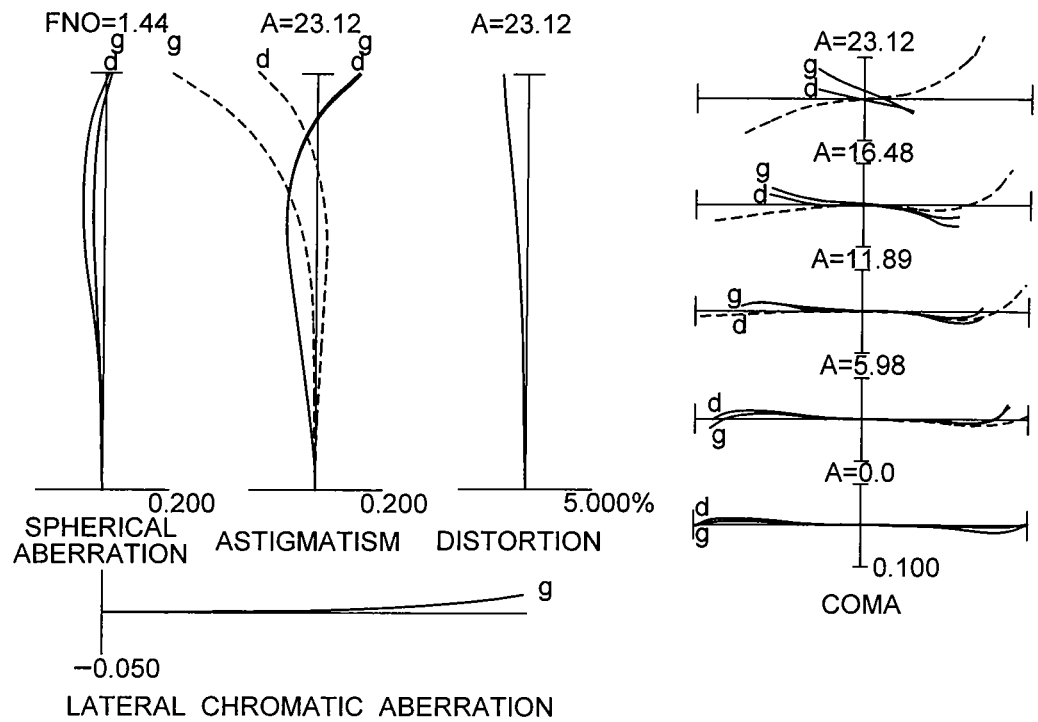
Figure 4B:
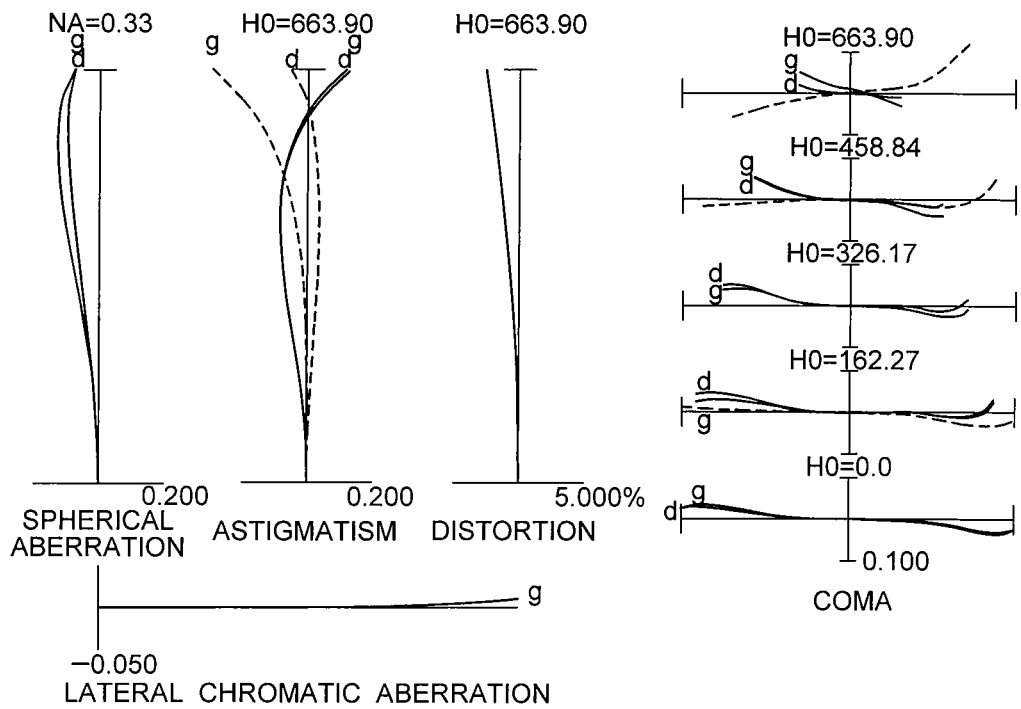

FIGS. 4A and 4B are graphs showing various aberrations of the optical system according to Example 2, in which FIG. 4A shows upon focusing on infinity (β=0.00), and FIG. 4B shows upon focusing on a close object (β=−1/30).

As is apparent from the respective graphs, the optical system according to Example 2 shows superb optical performance as a result of good corrections to various aberrations.

EXAMPLE 3

Figure 5:
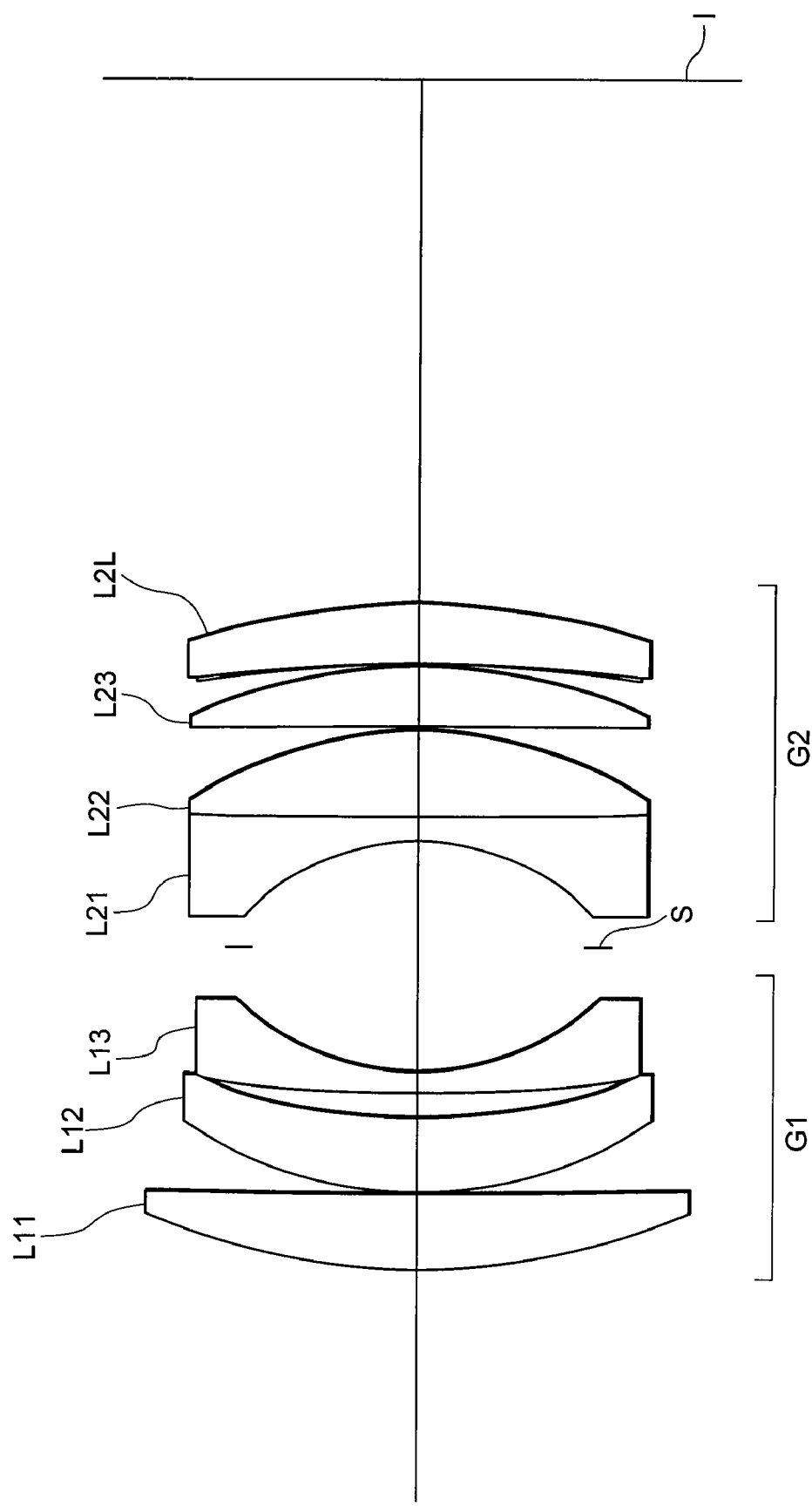
FIG. 5 is a sectional view showing a lens configuration of an optical system according to Example 3.

FIG. 5 is a sectional view showing a lens configuration of an optical system according to Example 3.

The optical system according to Example 3 is composed of, in order from an object along an optical axis of the optical system, a first lens group G1 having positive refractive power, and a second lens group G2 having positive refractive power. An aperture stop S is disposed between the first lens group G1 and the second lens group G2.

The first lens group G1 composed of, in order from the object along the optical axis, a 11 positive meniscus lens L11 having a convex surface facing the object and refractive power of the object side surface being stronger than that of the image side surface, a 12 positive meniscus lens L12 having a convex surface facing the object and refractive power of the object side surface being stronger than that of the image side surface, and a 13 negative meniscus lens L13 having a concave surface facing the image.

The second lens group G2 is composed of, in order from the object along the optical axis, a cemented lens constructed by a 21 double concave negative lens L21 having a larger radius of curvature on the image side surface cemented with a 22 double convex positive lens L22 having a smaller radius of curvature on the image side surface, a 23 double convex positive lens L23 having a stronger refractive power on the image side surface, and a 2L positive meniscus lens L2L disposed to the most image side of the optical system, being a compound type aspherical lens composed of a resin material and a glass material, having a convex surface facing the image, and an aspherical surface formed on a resin material facing the object. A ray of light emitted from the 2L lens forms an image on the image plane I.

Focusing on a close object is carried out by moving the first lens group G1 and the second lens group G2 in a body to the object along the optical axis.

Various values associated with the optical system according to Example 3 are listed in Table 3.

TABLE 3

[Lens Data]

| i | r | d | nd | νd |
|---|---|---|---|---|
| 1 | 45.6058 | 5.5000 | 1.772499 | 49.60 |
| 2 | 296.7518 | 0.1000 | | |
| 3 | 29.1170 | 5.5000 | 1.882997 | 40.76 |
| 4 | 39.4902 | 1.6000 | | |
| 5 | 73.0680 | 1.6000 | 1.647689 | 33.79 |
| 6 | 18.4729 | 9.3000 | | |
| 7 | ∞ | 7.7000 | Aperture Stop S | |
| 8 | −18.3644 | 1.8000 | 1.784696 | 26.29 |
| 9 | 342.0979 | 6.5000 | 1.804000 | 46.57 |
| 10 | −30.5985 | 0.2000 | | |
| 11 | 9394.4860 | 4.5000 | 1.834807 | 42.71 |
| 12 | −43.3481 | 0.1000 | | |
| 13* | −123.7741 | 0.1000 | 1.552810 | 37.63 |
| 14 | −123.7741 | 4.5000 | 1.772499 | 49.60 |
| 15 | −48.5167 | (Bf) | | |

[Aspherical Data]
Surface Number: 13

| K = | 1.0000 |
|---|---|
| A4 = | −2.7219E−06 |
| A6 = | 7.4832E−10 |
| A8 = | −2.5366E−12 |

[Specifications]

| f = | 51.60 |
|---|---|
| FNO = | 1.44 |
| ω = | 23.08 |
| Y = | 21.60 |
| TL = | 87.50 |

[Focusing Data]

| | Infinity | Close Range |
|---|---|---|
| R | ∞ | 1.64 (m) |
| β | 0.0 | −1/30 |
| Bf | 38.5022 | 40.2221 |

[Values for Conditional Expressions]

| (1): Bf/f = | 0.75 |
|---|---|
| (2): nP = | 1.553 |
| (3): nG = | 1.773 |
| (4): n2L = | 1.773 |
| (5): n2L − nP = | 0.220 |
| (6): (−r21a)/f = | 0.356 |
| (7): (−r21a)/r13b = | 0.994 |
| (8): r23b/r2Lb = | 0.893 |
| (9): n22 − n21 = | 0.019 |
| (10): ν22 − ν21 = | 20.3 |

Figure 6A:
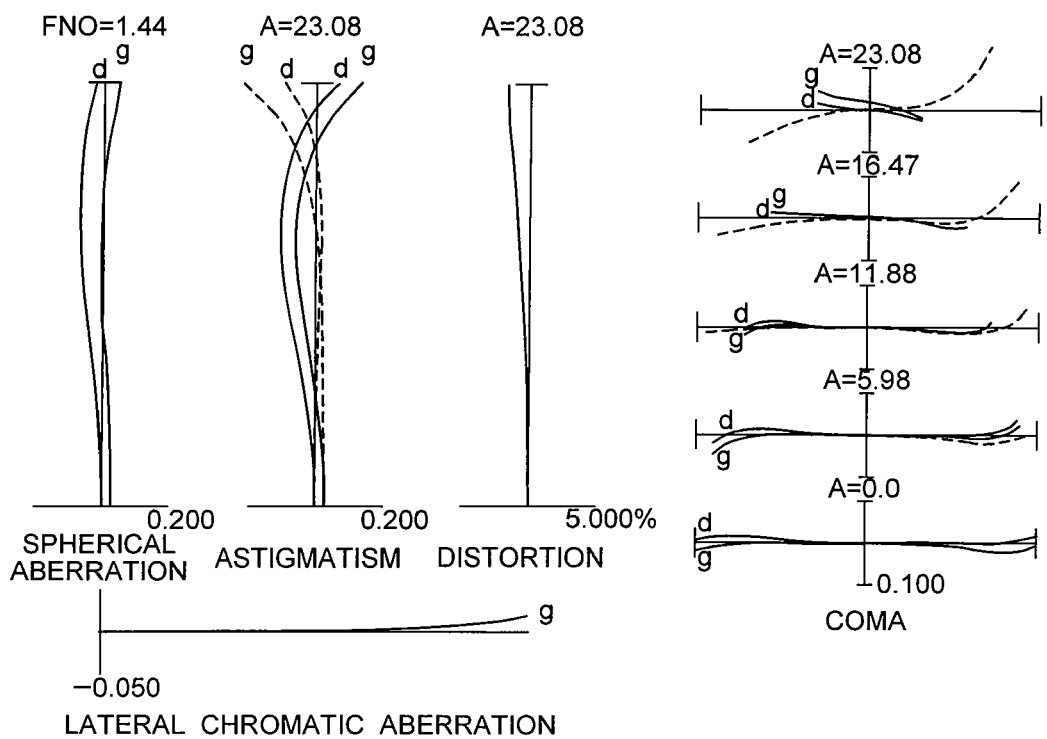
Figure 6B:
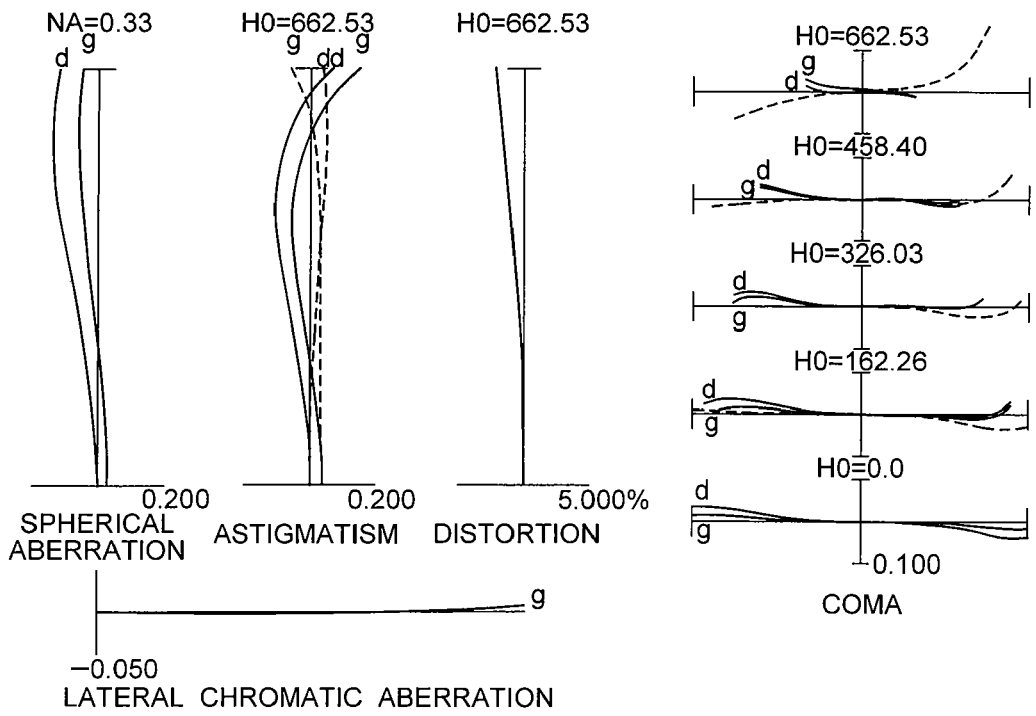

FIGS. 6A and 6B are graphs showing various aberrations of the optical system according to Example 3, in which FIG. 6A shows upon focusing on infinity ($\beta$=0.00), and FIG. 6B shows upon focusing on a close object ($\beta$=−1/30).

As is apparent from the respective graphs, the optical system according to Example 3 shows superb optical performance as a result of good corrections to various aberrations.

EXAMPLE 4

FIG. 7 is a sectional view showing a lens configuration of an optical system according to Example 4.

The optical system according to Example 4 is composed of, in order from an object along an optical axis of the optical system, a first lens group G1 having positive refractive power, and a second lens group G2 having positive refractive power. An aperture stop S is disposed between the first lens group G1 and the second lens group G2.

The first lens group G1 composed of, in order from the object along the optical axis, a 11 positive meniscus lens L11 having a convex surface facing the object and refractive power of the object side surface being stronger than that of the image side surface, a 12 positive meniscus lens L12 having a convex surface facing the object and refractive power of the object side surface being stronger than that of the image side surface, and a 13 negative meniscus lens L13 having a concave surface facing the image.

The second lens group G2 is composed of, in order from the object along the optical axis, a cemented lens constructed by a 21 double concave negative lens L21 having a larger radius of curvature on the image side surface cemented with a 22 double convex positive lens L22 having a smaller radius of curvature on the image side surface, a 23 double convex positive lens L23 having a stronger refractive power on the image side surface, and a 2L positive meniscus lens L2L disposed to the most image side of the optical system, being a compound type aspherical lens composed of a resin material and a glass material, having a convex surface facing the image, and an aspherical surface formed on a resin material facing the object. A ray of light emitted from the 2L lens forms an image on the image plane I.

Focusing on a close object is carried out by moving the first lens group G1 and the second lens group G2 in a body to the object along the optical axis.

Various values associated with the optical system according to Example 4 are listed in Table 4.

TABLE 4

[Lens Data]

| i | r | d | nd | vd |
|---|---|---|----|----|
| 1 | 46.0109 | 5.5000 | 1.788001 | 47.37 |
| 2 | 318.6937 | 0.1000 | | |
| 3 | 28.5452 | 5.5000 | 1.834807 | 42.71 |
| 4 | 39.4106 | 1.6000 | | |
| 5 | 76.5401 | 1.6000 | 1.647689 | 33.79 |
| 6 | 18.4793 | 9.3000 | | |
| 7 | ∞ | 7.7000 | Aperture Stop S | |
| 8 | −18.4961 | 1.8000 | 1.805181 | 25.42 |
| 9 | 31837.2730 | 6.5000 | 1.804000 | 46.57 |
| 10 | −30.3764 | 0.2000 | | |
| 11 | 5077.4803 | 4.5000 | 1.834807 | 42.71 |
| 12 | −42.7967 | 0.1000 | | |
| 13* | −137.6466 | 0.1000 | 1.552810 | 37.63 |
| 14 | −137.6466 | 4.5000 | 1.804000 | 46.57 |
| 15 | −51.5585 | (Bf) | | |

TABLE 4-continued

[Aspherical Data]
Surface Number: 13

| κ = | 1.0000 |
|---|---|
| A4 = | −2.3686E−06 |
| A6 = | −1.4624E−10 |
| A8 = | −4.6597E−14 |

[Specifications]

| f = | 51.60 |
|---|---|
| FNO = | 1.44 |
| ω = | 23.09 |
| Y = | 21.60 |
| TL = | 87.51 |

[Focusing Data]

| | Infinity | Close Range |
|---|---|---|
| R | ∞ | 1.64 (m) |
| β | 0.0 | −1/30 |
| Bf | 38.5097 | 40.2296 |

[Values for Conditional Expressions]

| (1): Bf/f = | 0.75 |
|---|---|
| (2): nP = | 1.553 |
| (3): nG = | 1.804 |
| (4): n2L = | 1.804 |
| (5): n2L − nP = | 0.251 |
| (6): (−r21a)/f = | 0.358 |
| (7): (−r21a)/r13b = | 1.001 |
| (8): r23b/r2Lb = | 0.830 |
| (9): n22 − n21 = | −0.001 |
| (10) v22 − v21 = | 21.2 |

Figure 8A:
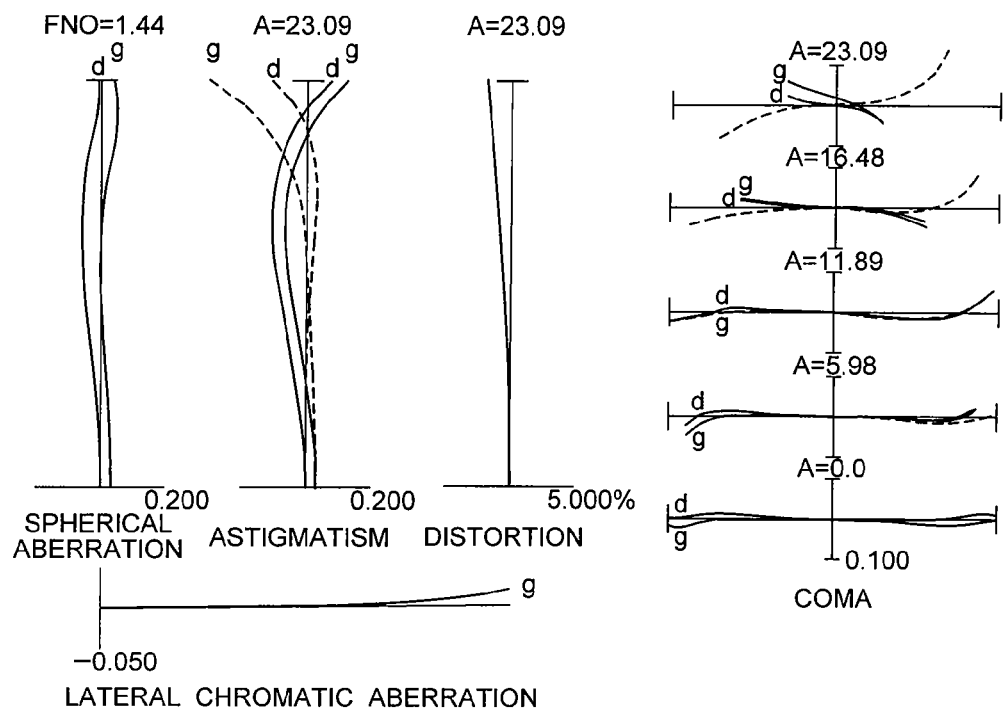
Figure 8B:
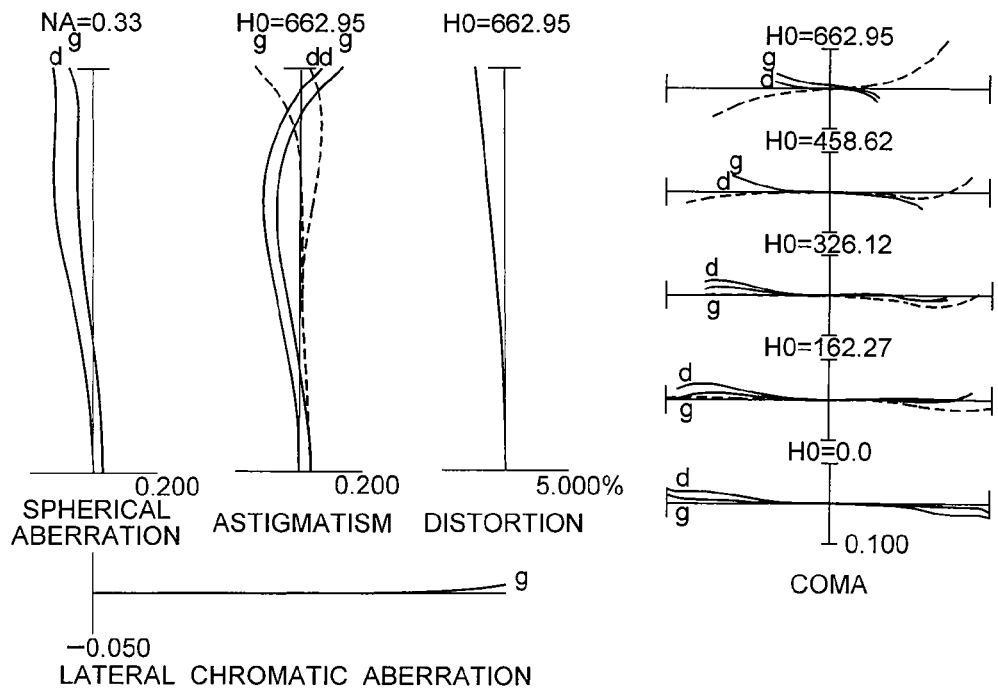

FIGS. 8A and 8B are graphs showing various aberrations of the optical system according to Example 4, in which FIG. 8A shows upon focusing on infinity ($\beta$=0.00), and FIG. 8B shows upon focusing on a close object ($\beta$=−1/30).

As is apparent from the respective graphs, the optical system according to Example 4 shows superb optical performance as a result of good corrections to various aberrations.

As described above, the present embodiment makes it possible to provide an optical system having a large aperture ratio, a long back focal length, high optical performance with excellently correcting various aberrations including sagittal coma, relatively low manufacturing cost, and being relatively easy to be manufactured.

Then, a camera equipped with an optical system according to the present embodiment is explained. Although a case that the optical system according to Example 1 is installed is explained, the same result is obtained by the other Examples.

Figure 9:
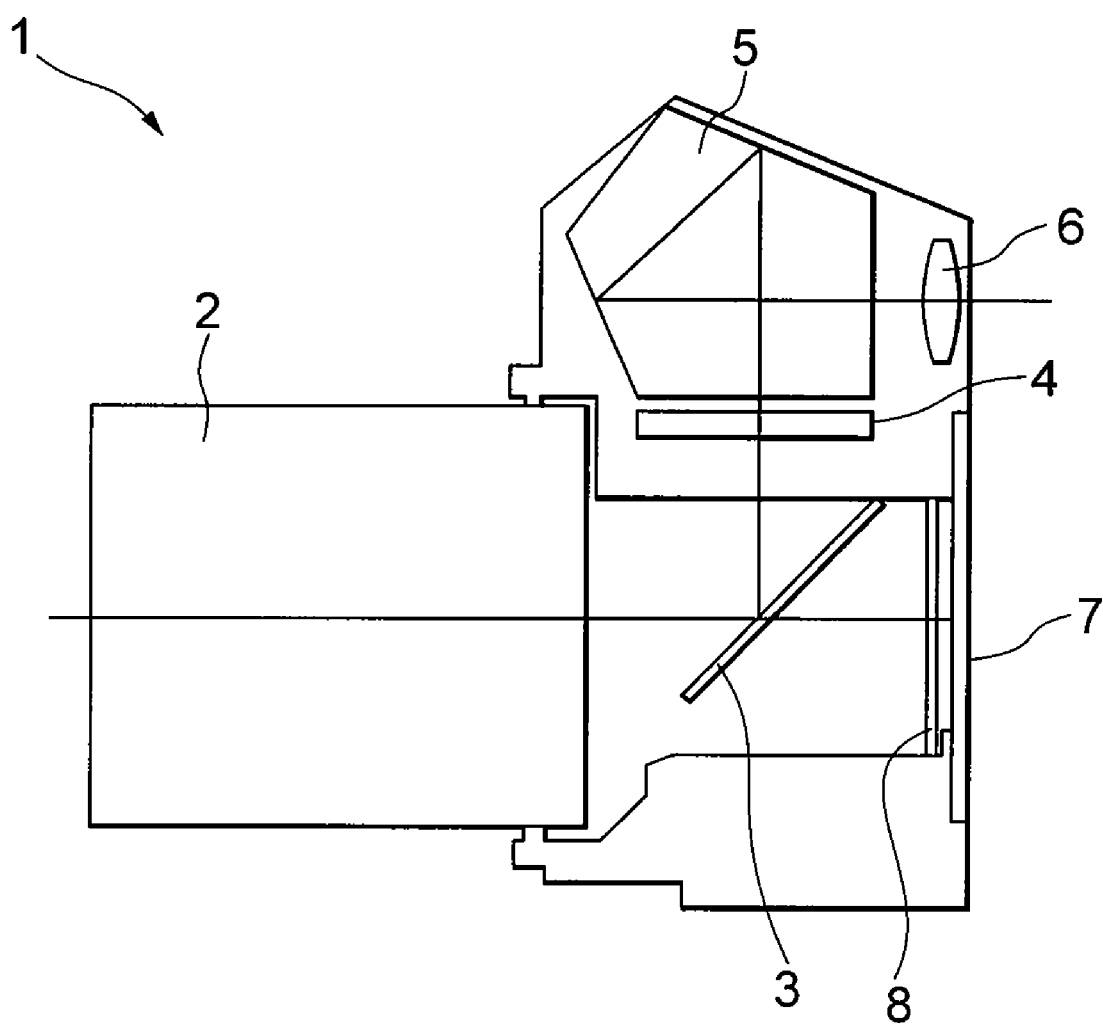
FIG. 9 is a diagram showing a camera configuration equipped with an optical system according to Example 1.

FIG. 9 is a schematic diagram showing a camera equipped with the optical system according to Example 1 of the present embodiment.

As shown in FIG. 9, the camera 1 is a single-lens reflex digital camera equipped with the optical system according to Example 1 as an image-taking lens 2. In the camera 1, light emitted from an object (not shown) is converged by an image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 as well as a focal plane shutter 8 is retracted from an optical path, and the light from the object (not shown) reaches an imaging device 7. Accordingly, light emitted from the object is captured by the imaging device 7 and stored in a memory (not shown) as an object image. In this manner, the photographer can take a picture of an object by the camera 1.

With installing the optical system according to Example 1 of the present embodiment into the camera 1 as an image-taking lens 2, it becomes possible to realize a camera having high optical performance.

Incidentally, the following description may suitably be applied within limits that do not deteriorate optical performance.

Although an optical system with a two-lens-group configuration is shown as each Example of the present embodiment, the present embodiment can be applied to other lens-group configurations such as a three-lens-group configuration.

A lens configuration that at least one lens or at least one lens group is added to the most object side or to the most image side of the optical system may be applicable.

In each Example, in order to carry out focusing from an infinity object to a close object, a portion of a lens group, a single lens group, or a plurality of lens groups may be moved along the optical axis.

The focusing lens group(s) may be used for auto focus, and suitable for being driven by a motor such as an ultrasonic motor.

A lens group or a portion of a lens group may be sifted in a direction perpendicular to the optical axis as a vibration reduction lens group for correcting an image blur caused by a camera shake. It is particularly preferable that the second lens group or a portion of the second lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed between the first lens group and the second lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. An optical system comprising, in order from an object along an optical axis of the optical system:
   a first lens group having positive refractive power; and
   a second lens group having positive refractive power;
   the second lens group including a negative lens, a first positive lens and a second positive lens, and
   the optical system having a compound-type aspherical lens constructed by a glass material and a resin material,
   wherein a distance between the first lens group and the second lens group is fixed upon focusing on infinity.

2. The optical system according to claim 1, wherein the first lens group includes a first positive lens with stronger refractive power on the object side surface than that on the image side surface, and a second positive lens having a meniscus shape with a convex surface facing the object.

3. The optical system according to claim 2, wherein the first lens group has a negative lens to the image side of the second positive lens in the first lens group.

4. The optical system according to claim 3, wherein the following conditional expression is satisfied:

$$0.900 < (-r21a)/r13b < 1.100$$

where r13b denotes a radius of curvature of the image side surface of the negative lens in the first lens group, and r21a denotes a radius of curvature of the object side surface of the negative lens in the second lens group.

5. The optical system according to claim 1, wherein the following conditional expression is satisfied:

$$0.60 < Bf/f < 1.00$$

where f denotes a focal length of the optical system, and Bf denotes a distance between the most image side lens surface of the optical system and an image plane.

6. The optical system according to claim 1, wherein the following conditional expression is satisfied:

$$1.400 < nP < 1.800$$

where nP denotes a refractive index of the resin material of the compound-type aspherical lens at d-line in which wavelength $\lambda = 587.6$ nm.

7. The optical system according to claim 1, wherein the following conditional expression is satisfied:

$$1.550 < nG$$

where nG denotes a refractive index of the glass material of the compound-type aspherical lens at d-line in which wavelength $\lambda = 587.6$ nm.

8. The optical system according to claim 1, wherein at least one lens surface from the image side lens surface of the first positive lens in the first lens group to the object side lens surface of the most image side lens is a compound-type aspherical surface.

9. The optical system according to claim 1, wherein the most image side lens is the compound-type aspherical lens.

10. The optical system according to claim 9, wherein the following conditional expression is satisfied:

$$1.700 < n2L$$

where n2L denotes a refractive index of the glass material of the compound-type aspherical lens at d-line in which wavelength $\lambda = 587.6$ nm.

11. The optical system according to claim 9, wherein the following conditional expression is satisfied:

$$n2L - nP < 0.400$$

where n2L denotes a refractive index of the glass material of the compound-type aspherical lens at d-line in which wavelength $\lambda = 587.6$ nm, and nP denotes a refractive index of the resin material of the compound-type aspherical lens at d-line in which wavelength $\lambda = 587.6$ nm.

12. The optical system according to claim 1, wherein the second lens group has only a lens having positive refractive power to the image side of the second positive lens in the second lens group.

13. The optical system according to claim 1, wherein the second lens group has only one lens to the image side of the second positive lens in the second lens group and the following conditional expression is satisfied:

$$0.680 < r23b/r2Lb < 1.000$$

where r23b denotes a radius of curvature of the image side surface of the second positive lens in the second lens group, and r2Lb denotes a radius of curvature of the image side surface of said one lens.

14. The optical system according to claim 1, wherein the following conditional expression is satisfied:

$$0.300<(-r21a)/f<0.450$$

where r21a denotes a radius of curvature of the object side lens surface of the negative lens in the second lens group, and f denotes a focal length of the optical system.

15. The optical system according to claim 1, wherein a distance between the first lens group and the second lens group is always fixed.

16. The optical system according to claim 1, wherein only one aspherical surface is in the optical system.

17. The optical system according to claim 1, wherein the negative lens in the second lens group and the first positive lens in the second lens group are cemented with each other.

18. The optical system according to claim 1, wherein the following conditional expressions are satisfied:

$$-0.050<n22-n21<0.050$$

$$16.0<v22-v21<40.0$$

where n21 denotes a refractive index of the negative lens in the second lens group at d-line in which wavelength λ=587.6 nm, n22 denotes a refractive index of the first positive lens in the second lens group at d-line in which wavelength λ=587.6 nm, v21 denotes an Abbe number of the negative lens in the second lens group, and v22 denotes an Abbe number of the first positive lens in the second lens group.

19. The optical system according to claim 1, wherein an aperture stop is disposed between the first lens group and the second lens group.

20. An optical apparatus equipped with the optical system according claim 1.

21. The optical system according to claim 1, wherein the negative lens of the second lens group is the most image side lens in the second lens group.

22. An optical system comprising, in order from an object along an optical axis of the optical system:
   a first lens group having positive refractive power; and
   a second lens group having positive refractive power,
   the first lens group including a first positive lens with stronger refractive power on the object side surface than that on the image side surface, and a second positive lens having a meniscus shape with a convex surface facing the object, and
   the optical system having a compound-type aspherical lens constructed by a glass material and a resin material.

23. The optical system according to claim 22, wherein the following conditional expression is satisfied:

$$0.60<Bf/f<1.00$$

where f denotes a focal length of the optical system, and Bf denotes a distance between the most image side lens surface of the optical system and an image plane.

24. The optical system according to claim 23, wherein the first lens group has a negative lens to the image side of the second positive lens in the first lens group.

25. The optical system according to claim 24, wherein the second lens group has a negative lens, and the following conditional expression is satisfied:

$$0.900<(-r21a)/r13b<1.100$$

where r13b denotes a radius of curvature of the image side surface of the negative lens in the first lens group, and r21a denotes a radius of curvature of the object side surface of the negative lens in the second lens group.

26. The optical system according to claim 22, wherein a distance between the first lens group and the second lens group is always fixed.

27. The optical system according to claim 22, wherein a distance between the first lens group and the second lens group is fixed upon focusing on infinity.

28. The optical system according to claim 22, wherein only one aspherical surface is in the optical system.

29. An optical apparatus equipped with the optical system according to claim 22.

30. A method for manufacturing an optical system having an optical axis, the method comprising:
   providing, in order from an object along the optical axis of the optical system, a first lens group having positive refractive power, and a second lens group having positive refractive power;
   providing a compound-type aspherical lens including a glass material and a resin material in the optical system; and
   disposing at least a negative lens, a first positive lens and a second positive lens in the second lens group,
   wherein a distance between the first lens group and the second lens group is fixed upon focusing on infinity.

31. The method according to claim 30, wherein the first lens group includes a first positive lens with stronger refractive power on the object side surface than that on the image side surface, and a second positive lens having a meniscus shape with a convex surface facing the object.

32. The method according to claim 30, further comprising a step of:
   satisfying the following conditional expression:

$$0.60<Bf/f<1.00$$

where f denotes a focal length of the optical system, and Bf denotes a distance between the most image side lens surface of the optical system and an image plane.

33. The method according to claim 30, further comprising a step of:
   satisfying the following conditional expression:

$$1.400<nP<1.800$$

where nP denotes a refractive index of the resin material of the compound-type aspherical lens at d-line in which wavelength λ=587.6 nm.

34. The method according to claim 30, wherein the second lens group has only the compound-type aspherical lens to the image side of the second positive lens in the second lens group.

35. The method according to claim 30, wherein a distance between the first lens group and the second lens group is always fixed 36. A method for manufacturing an optical system having an optical axis, the method comprising:
   providing, in order from an object along the optical axis of the optical system, a first lens group having positive refractive power, and a second lens group having positive refractive power;
   providing a compound-type aspherical lens including a glass material and a resin material in the optical system; and
   disposing at least a first positive lens with stronger refractive power on the object side surface than that on the image side surface, and a second positive lens having a meniscus shape with a convex surface facing the object in the first lens group.

* * * * *